United States Patent [19]

Merriman et al.

[11] 3,762,133

[45] Oct. 2, 1973

[54] PROCESS FOR THE SEPARATION OF COMPONENTS FROM GAS MIXTURES

[75] Inventors: James R. Merriman, Kingston; John H. Pashley, Oak Ridge; Michael J. Stephenson, Oak Ridge; David I. Dunthorn, Oak Ridge, all of Tenn.

[73] Assignee: The United States of America as represented by the United States Atomic Energy Commission

[22] Filed: Oct. 15, 1971

[21] Appl. No.: 189,543

[52] U.S. Cl............................. 55/44, 55/48, 55/53, 55/68, 55/71, 55/73
[51] Int. Cl............................................. B01d 53/16
[58] Field of Search ..................... 55/40, 44, 46, 48, 55/53, 56, 68, 71, 73, 84, 89

[56] References Cited
UNITED STATES PATENTS

| | | | |
|---|---|---|---|
| 3,121,624 | 2/1964 | Matsch et al. | 55/44 |
| 3,266,219 | 8/1966 | Woertz | 55/48 |
| 3,247,649 | 4/1966 | Miller | 55/48 X |
| 3,015,369 | 1/1962 | Brennan | 55/68 |
| 3,658,467 | 4/1972 | Maeck | 55/71 X |
| 3,140,932 | 7/1964 | McKee | 55/68 |

*Primary Examiner*—Samih N. Zaharna
*Assistant Examiner*—Richard W. Burks
*Attorney*—Roland A. Anderson

[57] ABSTRACT

A process for the removal, from gaseous mixtures, of a desired component selected from oxygen, iodine, methyl iodide, and lower oxides of carbon, nitrogen, and sulfur. The gaseous mixture is contacted with a liquid fluorocarbon in an absorption zone maintained at superatmospheric pressure to preferentially absorb the desired component in the fluorocarbon. Unabsorbed constituents of the gaseous mixture are withdrawn from the absorption zone. Liquid fluorocarbon enriched in the desired component is withdrawn separately from the zone, following which the desired component is recovered from the fluorocarbon absorbent.

10 Claims, 2 Drawing Figures

PROCESS FOR THE SEPARATION OF COMPONENTS FROM GAS MIXTURES

BACKGROUND OF THE INVENTION

This invention was made in the course of, or under, a contract with the United States Atomic Energy Commission.

This invention relates broadly to processes for the removal of a desired component selected from the group consisting of oxygen, iodine, methyl iodide, and the lower oxides of carbon, nitrogen, and sulfur from a gas mixture containing the desired component. The term "lower oxides" is used herein to refer to oxides having less than three oxygen atoms. The gas mixture may also contain any of such other components as air or any of the constituents thereof; hydrocarbons—e.g., methane and natural gas—; and various impurities, such as hydrogen sulfide, ammonia, hydrogen, or helium. More specifically, the invention relates to an improved absorption, or simple dissolution, process for the separation or recovery of a desired component of the kind specified above, this process being characterized by advantages which in large part are due to the use of a liquid fluorocarbon as the absorbent for the desired component. In referring to the input mixture to be separated by this process, the term "gas mixture" is used herein as inclusive of gases and vapors.

Among the more important applications of this invention are the removal of low-level contaminants from gas streams and the production of highly concentrated oxygen from air. Referring to contaminants, the emission to the atmosphere of man-made pollutants such as $N_2O$, $NO_2$, $SO_2$, and CO is currently of great concern. Also, the presence of radioactive iodine and methyl iodide in the off-gases from nuclear fuel reprocessing plants is viewed as a potentially serious problem. Furthermore, in the commercial production of oxygen by the liquefaction and rectification of air, carbon dioxide is a contaminant, since it must be removed from the feed gas. Many processes have been proposed as means for removing these various contaminants from gaseous mixtures, but in general these processes have been characterized by limitations or disadvantages.

The following are among the wide variety of processes proposed for the removal of the contaminants mentioned above: scrubbing with a chemically reactive liquid; adsorption on solids; catalytic oxidation; and absorption in solids or in liquids such as hydrocarbon solvents. Referring to absorption, the use of a liquid fluorocarbon absorbent (dichlorodifluoromethane, or $CCl_2F_2$) to derive a gas stream enriched in fission-product xenon and krypton from a gas input consisting of nitrogen, oxygen, xenon, krypton, and argon is reported in the following reference: Steinberg, S., Manowitz, B., and Pruzansky, J., Report BNL-542, "The Recovery of Fission Product Xenon and Krypton by Absorption Processes," Brookhaven National Laboratory (Jan., 1959). A similar process using xenon- and krypton-contaminated air as the feed gas and $CCl_2F_2$ or $CCl_3F$ as the fluorocarbon absorbent is discussed in Report K–L–6257, "Removal of Radioactive Krypton and Xenon from Contaminated Off-Gas Streams," Union Carbide Corporation, Nuclear Division (Aug., 1970).

It is an object of this invention to provide a novel process for the removal by selective absorption of a desired component selected from the group consisting of oxygen, iodine, methyl iodide, and the lower oxides of carbon, nitrogen, and sulfur from a gas mixture containing the desired component.

It is another object to provide an efficient and practicable process for removing the above-mentioned desired component from gas mixtures by contacting said mixtures with a liquid fluorocarbon absorbent circulated through a closed loop path.

It is another object to provide an efficient and practicable process of the kind described wherein absorption of the desired component is effected in a zone at superatmospheric pressure and wherein the resulting enriched absorbent is at least partially regenerated in a reduced-pressure zone.

Other objects of this invention will be made evident hereinafter.

SUMMARY OF THE INVENTION

In its broadest form, our process is summarized as follows: The process of removing a component selected from the group consisting of oxygen, iodine, methyl iodide, and the lower oxides of carbon, nitrogen, and sulfur from a feed gas mixture containing said component, said process comprising said gas mixture through an absorption zone at superatmospheric pressure in flowing contact with a liquid fluorocarbon to preferentially absorb said component in said fluorocarbon, withdrawing unabsorbed constituents of said gas mixture from said absorption zone, and separately withdrawing therefrom a stream of liquid fluorocarbon enriched in said component.

In our process the fluorocarbon absorbent flows in a closed loop path, and the fluorocarbon stream enriched in the desired component is continuously regenerated for recycle to the absorption zone. This is accomplished at least in part by passing the enriched fluorocarbon stream through a gas-stripping zone in flowing contact with a gaseous stripping agent (i.e., a gas or vapor). The stripping zone preferably is maintained at a pressure lower than that in the absorption zone. In most applications of our process the desired component is removed, or desorbed, from the fluorocarbon in the stripping operation and withdrawn from the stripping zone as a gas. In some applications, the gas-stripping operation preferentially removes absorbed components less soluble than the desired component; essentially all of the latter remains in solution. In such cases, at least part of the liquid fluorocarbon withdrawn from the stripping zone for recycling is treated to separate the desired component from the absorbent. The purified absorbent resulting from this treatment is recycled to the absorption zone.

In most applications of our process, the liquid stream of enriched fluorocarbon leaving the absorber is further enriched in the desired component before passage through the gas-stripping zone. This is accomplished by continuously passing the enriched fluorocarbon stream through a fractionation zone at a pressure lower than that in the absorption zone in order to desorb dissolved components less soluble than the desired component. Fractionation may be accomplished in a single operation—e.g., in a flash chamber—or in a multi-stage operation—e.g., a column where the enriched fluorocarbon is contacted with a stripping vapor or gas.

The term "key component" is used herein in connection with absorption and desorption operations. This term is used, for example, in referring to an absorption operation designed to separate the feed gas into an absorbed fraction enriched in the above-mentioned desired component and a fraction depleted in the same. In terms of an absorption step, the key component is defined as the most difficult-to-absorb constituent of the fraction enriched in the desired component. We prefer to select the conditions for absorption—e.g., the absorption pressure and temperature—so as to promote absorption of th key component, which may or may not be the above-mentioned desired component. For example, in the separation of nitrogen oxides from a gas mixture of such oxides, oxygen, and nitrogen, a highly pure nitrogen by-product is desired; in this instance, oxygen is the key component in the absorption step, and that step is designed for its removal. In a following stripping operation, however, $N_2O$ is the key component (i.e., the most difficult-to-strip constituent), and we prefer to design the stripping step for its removal. In our process the absorption zone is maintained at superatmospheric pressure to promote the amount of absorption of the key component.

Our process can be conducted with a wide variety of conventional equipment. For example, the above-mentioned absorption, fractionating, and stripping operations can be conducted conveniently in vertically oriented columns of the packed, plate, venturi or wetted-wall types, or, if desired, in tanks, spray chambers, venturi scrubbers, and the like. The transfer of fluids from column to column can be accomplished with standard compressors and pumps, in combination with pressure-reducing valves or the like, if desired. Standard heat exchangers and refrigerating devices can be employed to maintain desired operating temperatures and control solvent vapor losses. Conventional reboilers, flash chambers, and condensers also can be employed. Also, the routing and the feeding of the process streams can be designed to take advantage of existing concentration gradients, to minimize back-mixing, and to economize on power input and heat transfer.

DESCRIPTION OF THE PREFERRED EMBODIMENTS

General Comments on Liquid Fluorocarbon Absorbents

Figure 1:
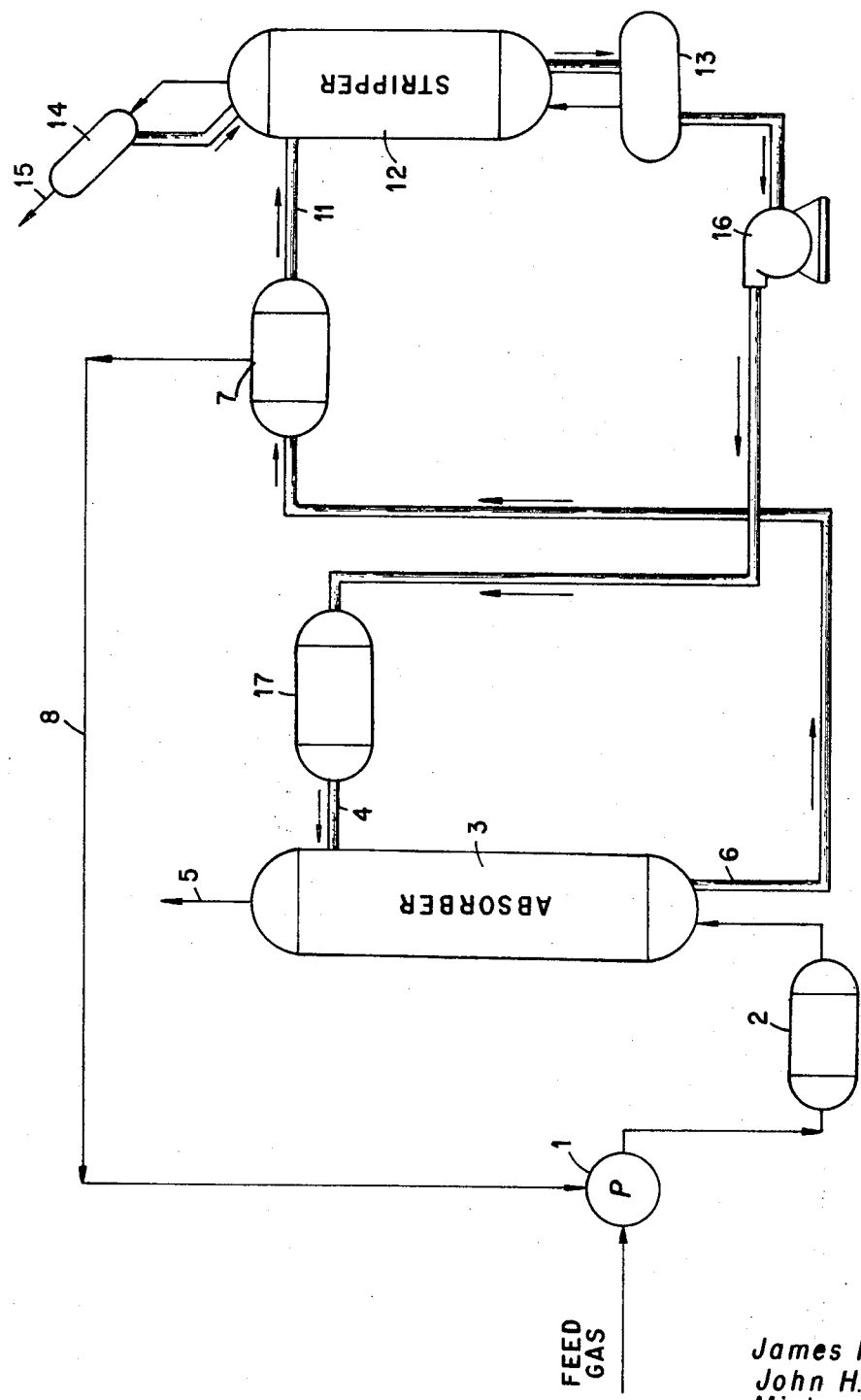
FIG. 1 is a schematic diagram of a system for conducting our process, the system being designed for an absorption operation and a stripping operation.

Our process is based on our finding that liquid fluorocarbons as a group are unusually suitable absorbents for removing from gas mixtures a desired component selected from the group consisting of oxygen, iodine, methyl iodide, and the lower oxides of carbon, nitrogen, and sulfur. With respect to absorption of the desired components named, liquid fluorocarbons as a group rate high with respect to capacity, selectivity, and resistance to attrition. Furthermore, liquid fluorocarbons offer a wide selection of physical properties, thus permitting the designer to select near-optimum temperature and pressure conditions for a given separation. Again, the liquid fluorocarbons provide a high margin of process safety, being nonflammable, nontoxic, and inert.

As an illustration of the high capacity which liquid fluorocarbons have for the desired components listed above, we have found that oxygen is about 100 times more soluble in $CCl_2F_2$ than in water. Table 1, below, presents approximate Henry's Law constants for selected gases in selected hydrocarbon and halocarbon solvents. The Henry's Law constants (which are inversely proportional to solubility) are on a mole basis. The figures shown in parentheses are experimentally derived values. The constants shown in this table were determined by using the thermodynamics-based model of Yen and Mcketta (*American Institute of Chemical Engineering Journal*, 8, 4—Sept., 1962), together with gas and liquid solubilities taken from the literature.

Table 2, below, is a similar showing for helium, hydrogen, sulfur dioxide, and carbon monoxide. In these cases the constants were obtained by (a) plotting the logarithms of the solubilities (Yen-McKetta) of the gases shown in Table 1 (excepting $N_2O$) versus the so-called Lennard-jones Lennard-Jones parameter $\epsilon/k$ for the gases shown in Tables 1 and 2; (b) drawing a straight line through the plotted data; and (c) extrapolating the line to give solubilities for helium, hydrogen, sulfur dioxide, and carbon monoxide.

It will be noted in Tables 1 and 2 that liquid fluorocarbons have a comparatively high capacity for the above-mentioned desired components and that some fluorocarbons have a higher capacity for a specific gas than do other fluorocarbons. Thus, from the standpoint of capacity and selectivity, the liquid fluorocarbons offer the plant designer a wide range of choice with respect to the selection of a particular solvent and leaves him comparatively free to optimize temperatures, pressures, and the like for a given separation.

TABLE 1

Henry's law constants (in atmospheres), at 75° F.

| Solvent | Nitrogen | Oxygen | Argon | Krypton | Xenon | Methane | Carbon dioxide | Nitrous oxide |
|---|---|---|---|---|---|---|---|---|
| $CCl_2F_2$ | 420 (690) | 400 (500) | 410 (385) | 230 (165) | 76 (66) | 240 | 88 | 73 (37) |
| $CCl_3F$ | 760 | 530 | 500 | 210 | 62 | 260 | 75 | 59 |
| $CCl_4$ (carbon tetrachloride) | 1,400 (1,600) | 820 (830) | 760 | 260 | 69 | 370 (350) | 93 (93) | 68 (59) |
| $C_2ClF_5$ | 340 | 450 | 510 | 360 | 130 | 320 | 160 | 120 |
| $C_2Cl_2F_4$ | 450 | 410 | 410 | 220 | 72 | 240 | 82 | 67 |
| $C_2Cl_3F_3$ | 650 | 480 | 460 | 200 | 62 | 250 | 73 | 59 |
| $CHClF_2$ | 500 | 410 | 400 | 200 | 65 | 230 | 74 | 61 |
| $CHCl_2F$ | 1,100 | 690 | 640 | 230 | 65 | 320 | 83 | 63 |
| $CHCl_3$ (chloroform) | 1,900 (2,200) | 910 (1,400) | 810 | 230 | 58 | 370 | 79 | 57 |
| $CBrF_3$ | 340 | 450 | 510 | 370 | 130 | 320 | 160 | 120 |
| $C_3Cl_2F_6$ | 460 | 400 | 400 | 210 | 68 | 230 | 78 | 64 |
| $c$-$C_4F_8$ | 300 | 250 | 240 | 140 | 47 | 150 | 47 | 42 |
| $C_4F_{10}$ (perfluorobutane) | 260 | 230 | 230 | 140 | 51 | 140 | 49 | 45 |
| $C_6H_6$ (benzene) | 2,100 (2,300) | 1,200 (1,200) | 1,100 (1,100) | 340 | 86 | 520 (480) | 130 (100) | 87 (75) |
| $C_6H_5Cl$ (chlorobenzene) | 2,400 (2,300) | 1,200 (1,300) | 1,000 | 280 | 69 | 460 (480) | 100 | 69 (76) |
| $CH_3I$ (methyl iodide) | 3,200 | 1,400 | 1,200 | 300 | 70 | 520 | 110 | 71 |
| $CH_3Br$ (methyl bromide) | 2,300 | 1,100 | 1,000 | 280 | 69 | 450 | 100 | 69 |
| $CH_3Cl$ (methyl chloride) | 1,400 | 790 | 730 | 240 | 66 | 350 | 87 | 64 |
| $CH_2Cl_2$ (methylene chloride) | 2,800 | 1,300 | 1,100 | 290 | 70 | 500 | 100 | 71 |
| $C_4H_{10}$ (butane) | 450 | 320 | 300 | 140 | 47 | 170 | 49 | 42 |

TABLE 2

| Solvent | Henry's Law Constants (in atmospheres), at 75°F | | | |
|---|---|---|---|---|
| | Helium | Hydrogen | Sulfur dioxide | Carbon monoxide |
| $CCl_2F_2$ | 2,900 | 1,800 | 40 | 420 |
| $CCl_3F$ | 6,200 | 3,400 | 27 | 730 |
| $CCl_4$(carbon tetrachloride) | 10,000 | 5,500 | 32 | 1200 |
| | (3,100) | (14) | (1100) | |
| $C_2ClF_5$ | 2,000 | 1,400 | 86 | 370 |
| $C_2Cl_2F_4$ | 3,000 | 1,900 | 37 | 420 |
| $C_2Cl_3F_3$ | 4,600 | 2,700 | 28 | 640 |
| $CHClF_2$ | 3,200 | 2,000 | 34 | 480 |
| $CHCl_2F$ | 8,800 | 4,800 | 26 | 1000 |
| $CHCl_3$(chloroform) | 20,000 | 9,600 | 21 | 1500 |
| | (4,500) | (1500) | | |
| $CBrF_3$ | 1,800 | 1,300 | 84 | 400 |
| $C_3Cl_2F_6$ | 3,300 | 2,000 | 34 | 450 |
| $c - C_4F_8$ | 1,800 | 1,100 | 23 | 280 |
| $C_4F_{10}$(perfluorobutane) | 1,000 | 700 | 32 | 250 |
| $C_6F_6$(benzene) | 17,000 | 9,000 | 35 | 1700 |
| | (13,000) | (3,900) | (4) | (1600) |
| $C_6H_5Cl$ (chlorobenzene) | 22,000 | 13,000 | 28 | 2000 |
| | (4,000) | (4) | (1600) | |
| $CH_3I$ (methyl iodide) | 33,000 | 18,000 | 25 | 2600 |
| $CH_3Br$ (methyl bromide) | 22,000 | 11,000 | 25 | 1800 |
| $CH_3Cl$ (methyl chloride) | 11,000 | 6,000 | 26 | 1200 |
| $CH_2Cl_2$(methylene chloride) | 28,000 | 16,000 | 22 | 2300 |
| $C_4H_{10}$ (butane) | 3,200 | 1,900 | 20 | 420 |

With respect to the absorption of the above-mentioned desired components, we have found that the

TABLE 3

GENERAL INCREASE IN SOLUBILITY OF PRIMARY AIR COMPONENTS WITH INCREASING FLUORINE SATURATION

| Solvent | Henry's Law Constants (in atmospheres), at 75°F | | | | |
|---|---|---|---|---|---|
| | Nitrogen | Oxygen | Argon | Krypton | Xenon |
| Fully Halogenated Methane Derivatives | | | | | |
| $CCl_2F_2$ | 420 | 400 | 410 | 230 | 76 |
| $CCl_3F$ | 760 | 530 | 500 | 210 | 62 |
| $CCl_4$(Carbon Tetrachloride) | 1400 | 820 | 760 | 260 | 69 |
| Fully Halogenated Ethane Derivatives | | | | | |
| $C_2ClF_5$ | 340 | 450 | 510 | 360 | 130 |
| $C_2Cl_2F_4$ | 450 | 410 | 410 | 220 | 72 |
| $C_2Cl_3F_3$ | 650 | 480 | 460 | 200 | 62 |
| Partially Halogenated Methane Derivatives | | | | | |
| $CHClF_2$ | 500 | 410 | 400 | 200 | 65 |
| $CHCl_2F$ | 1100 | 690 | 640 | 230 | 65 |
| $CHCl_3$ (Chloroform) | 1900 | 910 | 810 | 230 | 58 |
| Comparable Performance of Fully Halogenated Normal Solvents as Number of Carbons is Increased, with Fluorine-to-carbon Ratio Remaining Constant at 2-to-1 | | | | | |
| $CCl_2F_2$ | 420 | 400 | 410 | 230 | 76 |
| $C_2Cl_2F_4$ | 450 | 410 | 410 | 220 | 72 |
| $C_3Cl_2F_6$ | 460 | 400 | 400 | 210 | 68 |
| Ring Compound Example | | | | | |
| $C_4H_{10}$(Butane) | 450 | 320 | 300 | 140 | 47 |
| $C_4F_{10}$ (Fluorobutane) | 260 | 230 | 230 | 140 | 51 |
| $c - C_4F_8$ | 300 | 250 | 240 | 140 | 47 |

TABLE 4.—CAPACITY DATA FOR TWO FLUOROCARBON-HYDROCARBON ANALOGS

| Gas | Henry's law constants (in atmospheres), at 75° F. in indicated liquid | | Capacity advantage of fluorocarbon, factor of— | Henry's law constants (in atmospheres), at 75° F. in indicated liquid | | Capacity advantage of fluorocarbon, factor of— |
|---|---|---|---|---|---|---|
| | $C_7F_{16}$ | $C_7H_{16}$ | | $C_6F_{11}CF_3$ | $C_6H_{11}CH_3$ | |
| Helium | 1,120 | 4,020 | 3.6 | 1,320 | 6,370 | 4.8 |
| Neon | | | | 885 | 4,500 | 5.1 |
| Hydrogen | 714 | 1,450 | 2.0 | | | |
| Carbon monoxide | 258 | 578 | 2.2 | | | |
| Argon | 185 | 400 | 2.2 | 217 | 539 | 2.5 |
| Krypton | | | | 119 | 173 | 1.5 |
| Carbon dioxide | 47.9 | 82.6 | 1.7 | | | |
| Xenon | | | | 59.2 | 43.5 | 0.7 | fluoro analog of most hydrocarbons has a higher absorption capacity than the hydrocarbon. Table 3, below, illustrates our finding that, in general, increasing the degree of fluorine saturation decreases the Henry's Law constant (i.e., increases solubility). It will be noted (lower portion of the table) that increasing the number of carbon atoms does not affect solubility much, on a mole basis, so long as the fluorine-to-carbon ratio is held constant (the remaining bonds being filled with chlorine, in this example). Closing the chain to form fluorinated ring structures does not appear to alter capacity significantly. Table 4, below, further illustrates the capacity advantage obtained with many fluorocarbons as compared with hydrocarbons.

Our findings indicate that all liquid fluorocarbons, including those with eight or more carbon atoms, can be employed as the absorbent in our process for removing the above-mentioned desired component. Of course, certain liquid fluorocarbons are more suitable than others for a particular separation from the standpoints of capacity, selectivity, boiling point, critical point, stability, and the like. The absorption operation must be conducted at temperatures below the liquid absorbent boiling point prevailing in the absorption zone, and the boiling point in turn is limited to values below the critical point of the solvent. In most cases, the solubility of the aforementioned desired components in liquid fluorocarbons increases as the temperature is decreased, the solubility increase being more rapid with respect to the more soluble components. As the temperature is decreased, the selectivity for highly soluble gases—such as $N_2O$, $CO_2$, and $SO_2$—is increased relative to moderately soluble gases, such as $N_2$ and $O_2$, or to slightly soluble gases, such as $H_2$ and He.

The absorbent in our process preferably is a liquid fluorocarbon selected from the group consisting of alkane and cycloalkane derivatives having at least one fluorine atom; perfluoroamines, including heterocyclic compounds; and perfluoroethers, including heterocyclic compounds. Some suitable examples of the alkane and cycloalkane derivatives are: straight-chained compounds, such as $CBrF_3$, $CCl_2F_2$, $CHClF_2$, $C_2Cl_2F_4$, and $C_3Cl_2F_6$; branched-chained compounds, such as $C_5F_{12}$; and cyclic compounds, such as c — $C_4F_8$. The perfluoramine may, for example, be $(C_4F_9)_3N$, and the perfluorether be $C_3F_7CF_2OCF_2C_3F_7$. An example of a heterocyclic ether absorbent is

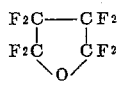

Other types of fluorocarbons can be used—as, for example, perfluoro alcohols, ketones, acids, and esters; but these are less suitable when all of their properties—selectivity, stability, corrosiveness, etc.—are considered.

Because liquid fluorocarbon absorbents typically operate with high gas loadings, the feasibility of a given selective-absorption process using such solvents cannot be predicted with assurance without experimental work to determine the equilibrium properties and the dynamic properties of the system of interest. That is, with fluorcarbon absorbents (many of which are polar) the process solutions are not the ideal dilute solutions usually encountered in absorption processes. Consequently, it is not evident a priori how the solute-solute interactions will affect equilibrium, mass transfer, and the like. Our work with the above-mentioned desired components has shown that in these instances, at least, selective absorption is feasible and practical.

Our process can best be understood by reference to the following illustrations of various forms thereof. The Henry's Law constants on which these illustrations are based have been determined by a somewhat more refined method than that described above in connection with Tables 1 and 2. For example, in the separation of oxygen from air, a value of 720 atmospheres was used for oxygen in $CCl_3F$.

Removal of Nitrogen Oxides from Gas Mixtures

There has long been a need for an efficient and economical process for reducing the emission of nitrogen oxides to the atmosphere. At present, such oxides are among the four most common primary air pollutants in terms of tons emitted annually throughout the United States. Some man-made nitrogen oxides are emitted by chemical processes not involving combustion, but the major source is combustion using air, two examples of which are fossil-fuel-fired power plants and plants for the production of nitric acid by the catalytic oxidation of ammonia. Combustion with air produces waste gas which is depleted in oxygen and enriched in nitrogen, and which contains nitrogen oxides—NO, chiefly, but also appreciable amounts of $NO_2$. In urban air, NO is converted to $NO_2$, which is a strong absorber of ultraviolet light from the sun and is the trigger for photochemical reactions that produce smog in polluted air. $NO_2$ also can combine with water vapor to form nitric acid. In concentrations above 2.5 ppm, $NO_2$ causes acute damage to some living plants; high levels (150–220 ppm) in short exposures produce fibriotic changes in the human lung.

Various techniques have been used for the removal of nitrogen oxides from gas mixtures. The following are some examples of such techniques: absorption of the oxides in water, caustic liquors, or dry oxides of lime; catalytic combustion; and catalytic decomposition.

The following is an illustration of our process as applied to the continuous removal of nitrogen oxides and oxygen from the vent stream of a conventional plant designed to produce 100 tons a day of 58 percent nitric acid by the catalytic oxidation of ammonia. Such vent streams, consisting mainly of nitrogen and a minor percentage of oxygen, commonly contain as much as 3,000 ppm nitrogen oxides, chiefly as NO. In this form of our process, the nitrogen oxide emissions are reduced by a factor of 100, providing highly pure ($\approx$99.8 percent) gaseous nitrogen as a by-product. The presence in the feed gas of such impurities as CO and $CO_2$ does not interfere with the desired separation.

Referring to FIG. 1, plant vent gas is introduced successively through a dual-inlet compressor 1, a dessicator (not shown), and a gas cooler 2 to the bottom of a packed-column absorber 3 maintained at a pressure of 1,500 psia and a temperature of 0°F. The gas rises in the column, where it is contacted with downflowing liquid fluorocarbon solvent, $CCl_3F$, introduced to the upper part of the absorber through an inlet 4. Essentially all of the nitrogen oxides are absorbed in the solvent, along with some nitrogen and a larger proportion of oxygen. The resulting highly pure unabsorbed nitrogen is withdrawn as gaseous product through an outlet 5 at the top of the column.

The downflowing liquid solvent, enriched in nitrogen oxides, flows from the column through a bottom withdrawal line 6 and through a single-stage fractionator 7—i.e., flash chamber. The chamber 7 is maintained at 150 psia and 0°F, under which conditions most of the dissolved nitrogen is desorbed, along with some nitrogen oxide. These desorbed gases are withdrawn through a line 8 and routed to the compressor for recycle through the absorber 3. The liquid solvent outflow from the chamber 7 is fed through an inlet 11 into the upper portion of a packed-column stripper 12, where it flows downwardly into a solvent reboiler 13 connected into the bottom thereof. The reboiler is operated at a temperature of 75°F. The stripper 12 is maintained at a pressure of 15 psia and 75°F. In the stripper, the downflowing liquid solvent is contacted by essentially pure, rising solvent vapor from the reboiler, with the result that essentially all of the nitrogen oxides and oxygen in the liquid are stripped therefrom. The resulting desorbed gaseous mixture flows from the top of the column into an overhead condenser 14, which is maintained at a temperature effecting solvent refluxing at the pressure of operation and limiting solvent vapor losses. Solvent liquefied in the condenser drains back into the stripper 12, whereas the stripped, gaseous nitrogen oxide and oxygen are withdrawn through a line 15 for return to the nitric acid plant. Purified (regenerated) solvent is withdrawn continuously from the bottom of the reboiler 13 by means of a pump 16 and passed through a chiller 17 for reducing its temperature to 0°F. The cold solvent effluent from the chiller is fed to inlet 4 of the absorber for recycle therethrough.

Tables 5 and 6, below, summarize respectively the plant performance data and the column design data of the process. The data presented in these tables and the flow patterns shown in FIG. 1 are not necessarily the optimum. Compositions shown in these and the other tables herein are in mole percent. As shown in Table 5, highly pure gaseous nitrogen ($\approx$99.8 percent purity) is produced at a rate of 170 tons a day. The use of a fluorocarbon solvent having higher capacity for nitrogen (e.g., $c - C_4F_8$) would provide an even more efficient process.

TABLE 5

|  | Flow Rate, scfm | Composition, % | | |
|---|---|---|---|---|
|  |  | Nitrogen | Oxygen | Nitrogen Oxides |
| Process Feed | 3,400 | 97 | 2.7 | 0.3 |
| Nitrogen Product | 3,060 | 99.97 | 0.03 | < 0.003 |
| Oxygen-Nitrogen Oxide Return | 340 | 70.3 | 26.7 | 3.0 |
| Absorber Feed | 12,300 | 93.3 | 6.0 | 0.7 |
| Flash Recycle | 8,900 | 91.9 | 7.3 | 0.8 |

$CCl_3F$ Flow Rate = 3,180 gpm
Nitrogen Product: 170 tons/day at 99.8% purity, or 99.97% with $CCl_3F$ removal treatment.
Basis: Typical tail gas from 100 ton/day 58% nitric acid production.

TABLE 6

COLUMN DESIGN DATA

|  | Absorber | Flash Recycle | Stripper |
|---|---|---|---|
| Operating Pressure, psia | 1500 | 150 | 15 |
| Operating Temperature, °F | 0 | 0 | 75 |
| Key Component | $O_2$ | — | $N_2O$ |
| L/kG (or L/kV) for Key Component | 1.54 | — | 0.5 |
| Percent of key Component Absorbed or Stripped | 99.6 | — | 99 |
| Number of Transfer Units | 13 | — | 8 |
| Height of Transfer Unit, ft | 3 | — | 3 |
| Packing (Pall Rings) Diameter, in. | 3.5 | — | 1.5 |
| Column Packed Height, ft. | 39 | — | 24 |
| Column Diameter, ft. | 6 | — | 2.4 |
| Approximate Solvent Boilup, lb mol/hr | — | — | 57 |

Removal of $SO_2$ from Gaseous Mixtures

There has long been a need for more effective processes for removing $SO_2$ from industrial vent gases. In the United States, the total emission of $SO_2$ to the atmosphere during 1967 amounted to 30.8 million tons, and this figure is expected to double in 1980 in the absence of more effective pollution control measures. Sulfur dioxide concentrations of 6–12 ppm cause immediate irritation to the human nose and throat, while gases containing as little as 3 ppm $SO_2$ have a noticeable odor. Concentrations of less than 1.0 ppm are believed injurious to plant foliage, and it is believed that normal ground level concentrations should be kept below 0.5 ppm. In the case of electrical power plants, high stacks can keep ground concetrations in this low range, but other $SO_2$ producers, such as sulfuric acid plants and sulfide ore roasting facilities, contain too much sulfur to rely on stacks alone.

The tail gas from conventional-contact sulfuric acid plants in the United States typically contains from 0.13 to 0.54% $SO_2$. About 17,000 lb/day of $SO_2$ is released from a plant producing 500 tons/day of acid, if the $SO_2$ concentration in the tail gas is 2,000 ppm (0.2 percent).

To reduce $SO_2$ emissions in sulfuric acid plant vent gases to below about 200 ppm, treatment of the vent gases will be necessary. The following are among the various techniques which have been proposed for such removal: absorbing the $SO_2$ in an MgO slurry, with which it reacts chemically to form magnesium sulfite; scrubbing the $SO_2$-containing gas with reactive solutions; and sorbing the $SO_2$ on molecular sieves or ion exchange resins. So far as is known, none of the previously proposed techniques has been proved commercially feasible for the reduction of $SO_2$ emissions to less than about 200 ppm.

The following is an illustration of one form of our process for continuously removing $SO_2$ from the vent gas of a conventional 500-ton/day sulfuric acid plant. This particular form of our process is designed for an overall $SO_2$ removal efficiency of 99 percent, and even higher efficiencies are practicable. Sulfur dioxide emission levels are reduced to 30 ppm or below; a gas stream containing 10% $SO_2$, the normal concentration for the input to the sulfuric acid plant, is provided for the recycle to the input.

Referring to FIG. 1, the plant lay-out and operation are generally similar to those described above in connection with the removal of nitrogen oxides. As shown, the $SO_2$-containing vent gas, consisting mainly of nitrogen and oxygen, is compressed in a pump 1 to the absorption-zone pressure (34.8 atmospheres). The compressed gas is passed through a conventional dessicant (not shown) to remove traces of water and oil, after which it is brought to absorption-zone temperature (50°F) in a cooler 2. The cooled gas is passed into the bottom portion of a packed-column absorber 3, where it is countercurrently contacted with a downflowing liquid fluorocarbon ($CCl_3F$, in this example). As a result, essentially all of the $SO_2$—and a small amount of oxygen, nitrogen, and other less soluble gases—is dissolved in the solvent. The unabsorbed gas, now purified of $SO_2$, is withdrawn from the top of the column through line 5.

Liquid solvent enriched in $SO_2$ is withdrawn from the bottom of the column through line 6 and is directed through a flash chamber 7 maintained at a comparatively low pressure (2 atmospheres) to flash off the bulk of the gases less soluble than $SO_2$. The desorbed gases from chamber 7 are recycled to the compressor 1 for mixing with incoming vent gas.

The $SO_2$-enriched liquid solvent effluent from the flash chamber 7 is routed directly to an inlet 11 in the upper portion of a packed-column stripper 12, where it flows downwardly into a solvent reboiler 13 connected into the bottom thereof. The reboiler is operated at a temperature of 75°F, and the stripper is operated at a pressure of only 1 atmosphere and a temperature of 75°F. In the stripper, downflowing liquid solvent is countercurrently contacted with essentially pure solvent vapor generated in the reboiler, the liquid-tovapor flow rate ratio being maintained at a low value to drive essentially all of the absorbed gases from the solvent. The resulting $SO_2$-rich gas-and-vapor mixture flows from the top of the column into the overhead condenser 14, which is maintained at a temperature suitable for refluxing solvent at the pressure of operation and controlling solvent losses by liquefaction of solvent vapor. The liquefied vapor drains back into the stripper 12. The $SO_2$-rich gases are withdrawn from the condenser, the valuable $SO_2$ being recovered therefrom by a suitable technique, for use in the production of sulfuric acid or elemental sulfur. Essentially pure solvent is withdrawn from the bottom of the reboiler 13 by means of a pump 16 and then directed, via a cooler 17 maintained at 50°F, to an inlet 4 in the top of the absorber 3 for recycle therethrough.

Tables 7 and 8, below, present performance data and column design data, respectively, for the process just described. It will be understood that the temperatures, flows, and pressures shown are not necessarily the optimum for this process. For example, $SO_2$ concentration factors above 100 can be obtained by lowering the pressure in the flash chamber 7 to drive off more of the dissolved gases having a lower solubility than $SO_2$. Although the solvent $CCl_3F$ is well suited for $SO_2$ removal, having a relatively low volatility and high $SO_2$-loading capacity, various other fluorocarbon solvents can be used with good results, e.g., $CCl_2F_2$, $CHClF_2$, $CHCl_2F$, and c — $C_4C_8$.

TABLE 7

PERFORMANCE DATA—$SO_2$ REMOVAL

| Composition, % | Flow Rate, scfm | sulfur Dioxide | Nitrogen | Oxygen | Argon |
|---|---|---|---|---|---|
| Process Feed | 21,900 | 0.3 | 92.2 | 6.4 | 1.1 |
| Sulfur Dioxide-Free Vent Gas | 21,200 | 30 ppm | 92.5 | 6.3 | 1.1 |
| Absorber Feed | 32,800 | 1.6 | 88.9 | 7.8 | 1.6 |
| Fractionator Recycle | 10,900 | 4.4 | 82.6 | 10.5 | 2.5 |
| Stripper Product | 650 | 10.0 | 76.4 | 11.0 | 2.7 |

$CCl_3F$ Flow Rate = 6,700 gpm
Sulfur Dioxide Removal Efficiency = 99%

TABLE 8

COLUMN DESIGN DATA—$SO_2$ REMOVAL

|  | Absorber | Flash Unit | Stripper |
|---|---|---|---|
| Operating Pressure, atmospheres | 34.8 | 2 | 1 |
| Operating Temperature, °F | 50 | 50 | 75 |
| Key Component | $SO_2$ | $N_2$ | $SO_2$ |
| L/kG (or L/kV) for Key Component | 2.80 | — | 0.051 |
| Percentage Absorbed or Stripped for Key Component | 99.8 | — | 99.9 |
| Number of Transfer Units | 9 | — | 8 |
| Height of Transfer Units, in. | 30 | — | 30 |
| Packing (Pall Rings) Size, in. | 3.5 | — | 3.5 |
| Column Packed Height, ft | 22.5 | — | 20.0 |
| Column Diameter, ft | 8.0 | — | 17.0 |
| Solvent Boilup, lb mole/min | — | — | 170 |

An $SO_2$- recovery process of the kind illustrated above is adapted for various other applications, as, for example, the removal of $SO_2$ from vent or stack gases from phosphate fertilizer plants, paper mills, smelters, and the like.

The Removal of $CO_2$ from Gas Mixtures

A major portion of commercially produced oxygen and nitrogen is obtained by the liquefaction and rectification of air. Atmospheric air contains up to 4 percent water and about 0.033 percent (330 ppm) carbon dioxide. Before the air can be liquefied and subsequently distilled, the water and carbon dioxide must be removed to prevent freeze-up of process equipment. Typically, the carbon dioxide content must be reduced to 0.5 ppm or less.

It is the common industrial practice to remove $CO_2$ from air by caustic scrubbing, the $CO_2$ reacting with the caustic to form a waste carbonate. That process, however, is not entirely satisfactory because of environmental problems and the difficulty of handling and disposing of the caustic and the waste carbonate. Carbon dioxide can be removed from air by passing the air through beds of soda lime. This, however, is a relatively expensive, batchwise technique.

The following is an illustration of our process as directed, in pilot plant experiments, to the removal of carbon dioxide from an air input of 7 scfm. Carbon dioxide removal efficiencies of 99 percent have been obtained with this particular form of our process, and even higher efficiencies are obtainable. The fluorocarbon solvent is not consumed or degraded but is recycled; thus, no bulk chemical makeup is necessary.

Figure 2:
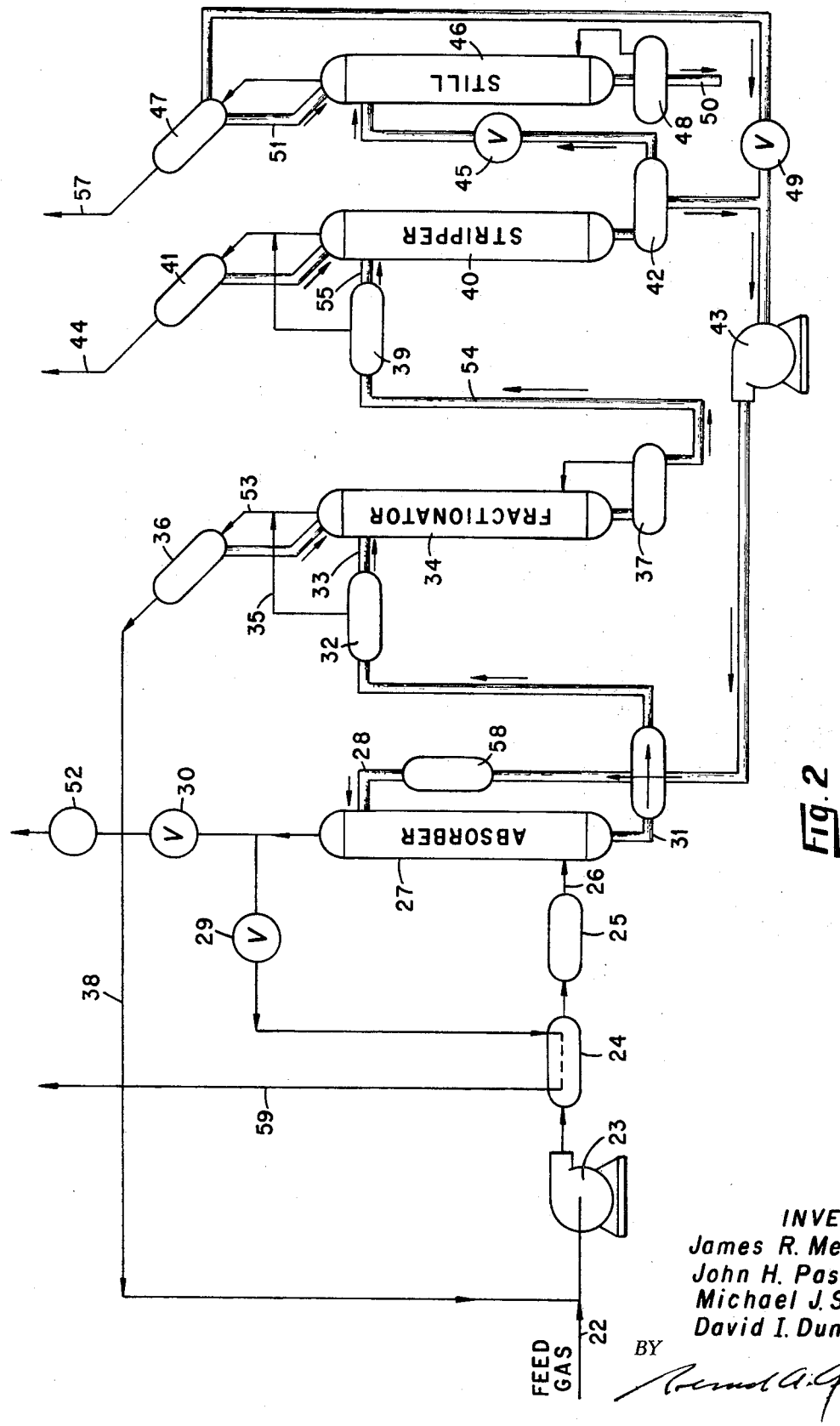
FIG. 2 is a similar diagram of a system for conducting absorption, fractionating, stripping, and distillation operations in accordance with our process.

Referring to FIG. 2, atmospheric air is compressed in a pump 23 to 21.4 atmospheres, the pressure selected for the absorption operation. The compressed gas is passed through a standard dessicator (not shown) and then through a cooler 24 and a chiller 25, which reduce its temperature to −25°F, the temperature selected for the absorption operation. The cold gas is fed through an inlet 26 into the bottom of a packed-column absorber 27, designed to contain 9 transfer units. In the absorber, the gas is contacted countercurrently with downflowing liquid $CCl_2F_2$ introduced through an upper inlet 28. Under the selected contacting conditions (see Table 10, below), essentially all of the more soluble components of the gas ($CO_2$, Kr, Xe) are dissolved in the solvent, together with relatively small amounts of the less soluble components ($O_2$, $N_2$, A). The cold, unabsorbed gases, now essentially $CO_2$-free, are withdrawn from the top of the absorber and routed, by means of valves 29 and 30, through the cooler 24 to cool incoming feed gas. The $CO_2$-free gas then is routed through line 59 to a liquefaction plant, to storage drums, etc.

Liquid absorbent containing dissolved gas enriched in $CO_2$, Kr, and Xe flows from the bottom of the absorber 27 and through a heat exchanger 31, where it is pre-heated. The pre-heated solvent is directed through a flash chamber 32 and an inlet 33 into the upper portion of a packed-column fractionator 34 designed to enrich the gas dissolved in the solvent by removing most of the less-soluble oxygen, nitrogen, and argon therefrom. The flash chamber 32 and the fractionator are maintained at a much lower pressure (3 atmospheres) and a higher temperature (30°F) than the absorber 27. In chamber 32, part of the solvent is vaporized and part of the absorbed gases are flashed off; these flow through line 35 into an overhead condenser 36 for the fractionator.

In the fractionator 34, the liquid solvent introduced through inlet 33 is countercurrently contacted with vapor rising from a solvent reboiler 37 connected into the bottom of the column. The rising vapor strips from the solvent a gas mixture consisting mainly of oxygen and nitrogen, together with relatively small amounts of argon, carbon dioxide, krypton, and xenon. These desorbed gases, together with solvent vapor, flow from the top of the fractionator into the overhead condenser 36, which is operated at a temperature liquefying the solvent vapor. The off-gas from the condenser is recycled through line 38 and blended with the air input to the absorber. Condensed solvent drains from the condenser into the fractionator.

Liquid solvent containing gas enriched in carbon dioxide, krypton, and xenon is withdrawn from the fractionator reboiler 37 and directed, via a flash chamber 39, into the top portion of a packed-column stripper 40. Vapor and gases flashed off in chamber 39 flow into an overhead condenser 41 for the stripper. In the stripper, the liquid solvent flows downward, contacting rising vapors from a solvent reboiler 42 connected into the bottom of the column. As indicated in Table 10, the stripper is operated at a somewhat higher stripping factor ($L/kV$—ratio of liquid downflow in moles/hr. to vapor upflow in moles/hr., divided by the equilibrium constant $k$) and at a lower pressure and temperature than the fractionator in order to drive the remainder of the absorbed gases from the solvent.

Essentially pure solvent is withdrawn from the stripper reboiler and is routed, valves 45 and 49 being closed, to a solvent pump 43. The pump forwards the solvent through the cooler 31, where it serves as a warming medium, and then through a chiller 58, where it is cooled to absorption-zone temperature. The chilled solvent is recycled to the top portion of the absorber through inlet 28. Referring again to the stripper 40, solvent vapor and the $CO_2$-rich gas driven from the solvent pass into the overhead condenser 41, where the vapor is liquefied for drainage back to the stripper. The $CO_2$-rich gas is withdrawn from the condenser through line 44 for venting or storage.

Tables 9 and 10, below, present plant performance data and column design data for the system just described. The system parameters were selected to effect good $CO_2$ removal and concentration, as well as convenient operation. They are not necessarily optimum values. The process parameters can, of course, be varied to accommodate different feed compositions, product concentrations, and the like.

TABLE 9

$CO_2$ REMOVAL

| | Flow Rate scfm | Composition, % | | | |
|---|---|---|---|---|---|
| | | Carbon Dioxide | Nitrogen | Oxygen | Argon |
| Process Feed | 7.0 | 330 ppm | 78.1 | 21.0 | 0.9 |
| Purified Air Product | ~7.0 | 3 ppm | 81.8 | 17.8 | 0.8 |
| Absorber Feed | 10.5 | 550 ppm | 77.5 | 21.5 | 1.0 |
| Fractionator Recycle | 3.5 | 0.1 | 69.0 | 29.6 | 1.4 |
| Stripper Product | 0.004 | 82.9 | 9.6 | 6.8 | 0.6 |

$CCl_2F_2$ Solvent Flow Rate = 1.0 gpm
Carbon Dioxide Removal Efficiency = 99%

TABLE 10

PILOT PLANT COLUMN DATA—$CO_2$ REMOVAL

| | Absorber | Fractionator | Stripper |
|---|---|---|---|
| Operating Pressure, atmospheres | 21.4 | 3 | 1.5 |
| Operating Temperature, °F | −25 | 30 | 0 |
| Key Component | $CO_2$ | $O_2$ | $CO_2$ |
| L/kV (or L/kG) for Key Component | 2.28 | 0.047 | 0.413 |
| Percent Absorbed or Stripped for Key Component | 99 | 99.9 | 99 |
| Number of Transfer Units | 8 | 7 | 7 |
| Height of Transfer Units, inches | 13.5 | 15.4 | 13.7 |
| Column Packing | Goodloe | Goodloe | Goodloe |
| Column Packed Height, ft | 9 | 9 | 8 |
| Column Diameter, inches | 3 | 3 | 6 |
| Solvent Boilup, lb/hr | — | 145 | 322 |

As an illustration of the flexibility of the process, the $CO_2$-removal efficiency can be increased from about 99 percent for the system just described to over 99.9 percent by increasing the stripper-column diameter to 10 inches so as to allow increasing the stripping vapor flow to 1,220 lb/hr and by operating the stripper at a liquid-to-vapor flow ratio of 1.5 (on a mole basis). In this modified arrangement a further gain could be realized by increasing the absorption-zone pressure from 21.4 to 25.4 and slightly reducing the gas feed to the absorber to improve the key-component absorption factor, $L/kG$, from 2.28 to 4.17. Scale-up of the system to handle larger flows can be accomplished by applying conventional engineering techniques.

As a further illustration of the flexibility of our process, $CO_2$ removal with $CCl_2F_2$ absorbent can be accomplished in the system of FIG. 2 without the column fractionator and its associated flash chamber, condenser, and reboiler. This omission is reflected, however, in the production of less $CO_2$-free gas per unit of input air. In the process as designed in accordance with Table 9, nearly 7.0 scfm of $CO_2$-free gas is produced from 7.0 scfm of air, whereas only 3.5 scfm of $CO_2$-free gas is produced without the fractionator system. If desired, the fractionator column 34 and reboiler 37 can be eliminated and the associated flash chamber 32 and condenser 36 retained. As a result, depending on the operating pressure of the flash chamber 32, an intermediate fraction of the less soluble gases dissolved in the solvent leaving the absorber can be driven from the solvent and recycled. Consequently, the ratio of $CO_2$-free gas produced per unit of air input will be near that of a three-column plant, and the stripper off-gas will be more concentrated than that obtained if the entire fractionator system is eliminated.

The preferred operating conditions are as follows for a three-column $CO_2$-removal plant utilizing $CCl_2F_2$ as the solvent.

1. Absorption at pressures of about 7 to 27 atmospheres, temperatures of −50° to 0°F, and solvent-to-gas mole ratios of 3 to 6.
2. Column fractionation at pressures of 3 to 6 atmospheres, temperatures of 31° to 73°F. (the corresponding boiling point temperature) and liquid-to-vapor or to-gas ratios of 3 to 6.
3. Stripping at pressures of subatmospheric to 3 atmospheres, temperatures of below −25°F to 30°F, and with liquid-to-vapor ratios of 1.5 to 3.

A significant reduction in refrigeration costs is obtained by using $CCl_3F$ as the fluorocarbon absorbent rather than $CCl_2F_2$, since the former is much less volatile. Various other fluorocarbon solvents can be used, if desired, and their use will be reflected in different preferred operating conditions for the absorption, fractionation, and stripping operations. These conditions can be determined by the application of standard engineering techniques. For example, the use of $CCl_3F$ instead of $CCl_2F_2$ as the solvent changes the above-listed preferred operating conditions as follows.

1. Absorption: 14 to 40 atmospheres; 0° to 50°F; L/V (or L/G) ratios, 4 to 7.
2. Fractionation: 4 to 13 atmospheres; 158° to 225°F; L/V (or L/G) ratios, 3 to 6.
3. Stripping: subatmospheric to 3 atmospheres; 60° to 158°F; L/V (or L/G) ratios, 1 to 3.

Removal of Iodine and Methyl Iodide from Vent Gases

In a reprocessing plant for recovering uranium and plutonium from spent nuclear fuel elements, the process vent gas contains kyrpton and xenon, and small concentrations of iodine. Radioactive isotopes of these substances comprise a major air-borne contaminant, and their removal has for some years been of considerable concern. In a typical 6-ton/day reprocessing plant, the off-gas contains, on the average, 40 ppb iodine, up to about 10 percent of which is methyl iodide. During fuel element dissolution, peak iodine concentrations of 200 ppb may be present in the off-gas.

Various methods have been suggested for the removal of such iodine and methyl iodide. Perhaps the most promising of these previously proposed methods in sorption, using silver zeolites. That technique is not entirely satisfactory, however, because of the limited availability of silver zeolites at this time and the expense thereof, and because of the susceptibility to poisoning, the problems involved in integrating this operation into an over-all off-gas processing train, and the batchwise nature of the operation.

Our process involving selective absorption in a liquid fluorocarbon is applicable to the simultaneous recovery of iodine and methyl iodide from various off-gases, including those from a nuclear fuel element reprocessing plant. Our process is particularly well adapted for the latter application because it can be combined with a process for the removal of xenon and krypton. That is, we have found the solubilities of iodine and methyl iodide in liquid fluorocarbons are such that they can be co-absorbed (co-dissolved) in fluorocarbon solvent at the same time that krypton and xenon are absorbed. After concentration in a fractionation operation the noble gases in the solvent then can be selectively removed in a stripping operation, after which the solvent is processed to provide a waste product rich in iodine and methyl iodide.

The following is an illustration of our method as directed to preventing the release to atmosphere of 99.9 percent of the iodine and methyl iodide present in the off-gas of a 6-ton/day plant for reprocessing nuclear fuel elements. In this instance, the plant off-gas consists essentially of the following: nitrogen, oxygen, krypton, xenon, and low levels (see above) of iodine and methyl iodide. The off-gas flow rate is 300 scfm.

Referring to FIG. 2, the plant lay-out and the flow patterns are for the most part similar to those described above in connection with the recovery of carbon dioxide. As shown, the above-described reprocessing plant off-gas is compressed in a pump 23 and cooled in a cooler 24 and chiller 25 to bring the gas to absorption-zone pressure (375 psia) and temperature (−25°F). The gas then is admitted to the bottom of a packed-column absorber 27, where it countercurrently contacts downflowing liquid $CCl_2F_2$ introduced to the upper portion of the column through inlet 28. The conditions for contacting (see Table 12, below) are selected to dissolve essentially all of the xenon, krypton, iodine, and methyl iodide in the fluorocarbon. The cold, unabsorbed gas is withdrawn from the top of the column, routed through a valve 29 and the feed gas cooler 24, and vented.

Liquid solvent enriched in the more soluble gases (xenon, krypton, iodine, and the iodide) is withdrawn from the bottom of the absorber, warmed in a heat exchanger 31, and routed, via a flash chamber 32, to a packed-column fractionator 34 operated at 44 psia and 30°F. Gas and solvent vapor flashed off in the chamber 32 are routed to an overhead condenser 36 for the fractionator column. The liquid solvent effluent from the chamber 32 is introduced into the upper portion of the column 34, where is flows downward while contacting rising solvent vapor from a reboiler 37 connected into the bottom of the column. This contact enriches the gas dissolved in the liquid solvent by removing most of the less soluble gases—oxygen and nitrogen. These are withdrawn from the column through the overhead condenser 36 and recycled through line 38 to mix with incoming feed gas.

Enriched liquid solvent from the fractionator reboiler 37 is fed through a flash chamber 39 and then into the top portion of a packed-column stripper 40 operated at 22 psia and 0°F. In chamber 39, solvent vapor and some of the absorbed gases are flashed off; these are directed into an overhead condenser 41 for the stripper. In the stripper, the enriched solvent received from the absorber countercurrently contacts rising vapor generated in a solvent reboiler 42 connected into the bottom of the column. Under the conditions of contacting (see Table 12), krypton and xenon are preferentially stripped from the solvent. The desorbed gases and solvent vapor are passed through the condenser 41, which is operated at a temperature condensing the vapor. The gases are withdrawn through line 44 and collected. The collected gas contains less than 0.0000001 ppm iodine and less than 0.000055 ppm methyl iodide. Tables 11 and 12, below, respectively present the column design data and performance data for the part of the system thus far described.

TABLE 11

PLANT PERFORMANCE DATA—REMOVAL OF IODINE AND METHYL IODIDE

| | Flow Rate | Iodine | Methyl Iodide |
|---|---|---|---|
| Process Feed | 300 scfm | 0.04 ppm | 0.004 ppm |
| Solvent Flow to Absorber | 100 gpm | 0.01 ppm | 0.001 ppm |
| Sidestream to Iodine Distillation Column | 30 gpm | 0.014 ppm | 0.0014 ppm |
| Return from Iodine Distillation Column | 30 gpm | <0.001 ppm | 0.0001 ppm |
| Iodine-methyl Iodide Product | 0.56 gal/day | 0.1% | 0.01% |

TABLE 12
COLUMN DATA—REMOVAL OF IODINE AND METHYL IODIDE

|  | Absorber | Fractionator | Stripper |
|---|---|---|---|
| Operating Pressure, atmospheres | 25.5 | 3 | 1.5 |
| Operating Temperature, °F | −25 | 30 | 0 |
| Key Component | Kr | $O_2$ | Xe |
| L/kG (or L/kV) for Key Component | 4.2 | 0.05 | 0.37 |
| Percent Absorbed or Stripped for Key Component | 99.9 | 99.9 | 99.99 |
| Number of Transfer Units | 9 | 7 | 13 |
| Height of Transfer Units, ft | 2 | 2 | 2 |
| Column Packing (Pall rings) diameter, in | 1.5 | 1.5 | 1.5 |
| Column Packed Height, ft | 18 | 14 | 26 |
| Column Diameter, ft | 2.5 | 2.5 | 5.0 |
| Solvent Boilup, lb mole/hr | — | 120 | 270 |

Liquid solvent draining into the stripper reboiler 42 is rich in dissolved iodine and methyl iodide. To prevent appreciable buildup of these inpurities in the solvent and to provide a concentrated product containing the same, part of the stripper reboiler bottoms is withdrawn through a valve 45 as a sidestream. The remainder of the bottoms is routed directly to a solvent-recycle pump 43, whose output is routed to inlet 28 of the absorber 27, after cooling to −25°F in a chiller 58.

Referring again to the stripper reboiler 42, the solvent sidestream (comprising 30 percent of the total solvent flow) is directed into the top portion of a conventional still 46, the design data for which are summarized in Table 13, below. The still is provided with an overhead condenser 47 and a reboiler 48. Vapor from the top portion of the still rises into the condenser and is liquefied therein, part of the resulting condensate (essentially pure $CCl_2F_2$) being directed through a line 51 and a valve 49 for blending with the main solvent input to the recycle pump 43. Inert off-gases from the condenser exit through a bleed line 57. Still bottoms collecting in the reboiler 48 are withdrawn through line 50 as an iodine waste stream for further concentration and/or storage.

TABLE 13
REMOVAL OF IODINE AND METHYL IODIDE

|  | Iodine Distillation Column |
|---|---|
| Operating Pressure, atmosphere | 1 |
| Operating Temperature, °F | −22 |
| Key Components | $CCl_2F_2$, Methyl Iodide |
| Relative Volatility of $CCl_2F_2$ to Methyl Iodide | 20 |
| Boilup Rate, gpm | 33 |
| Number of Transfer Units | 6 |
| Height of a Transfer Unit, feet | 2 |
| Column Packed Height, feet | 12 |
| Column Diameter, feet | 2.5 |
| Packing (Pall Rings) Diameter, inches | 1.5 |

Various other conventional techniques can be used to separate the solvent sidestream into a waste fraction rich in iodine and methyl iodide and a purified (regenerated) fraction suitable for recycle to the absorber. Among these other techniques are the following: solvent extraction, sorption in or on solids, trapping, and various reactions, as with reductants contained in non-miscible solvents.

It will be understood that the process feed points shown in FIG. 2 are not necessarily the optimum. In the recovery of iodine and methyl iodide, for example, and improvement in efficiency can be obtained if the purified solvent withdrawn from the still through line 51 is fed separately into the absorber 27 at a point above the inlet 28 for introducing the remainder of the recycled solvent. As another example, efficiency can be improved by feeding the columns at multiple points to minimize back-mixing.

Production of Enriched Oxygen from Air

Recent developments have increased the potential large-scale utilization of enriched oxygen. For example, use of enriched oxygen rather than air in metallurgical operations is economically and technically attractive. The use of enriched oxygen rather than air to treat sewage also appears attractive. Oxygen is prepared commercially in large quantities by liquefying air and distilling the resulting liquid. That process is largely satisfactory, but it lacks complete flexibility and requires extensive air pre-treatment to remove impurities, including carbon dioxide.

The following is an illustration of our process as directed to the large-scale production of oxygen from air on a continuous basis. Our process provides high-purity nitrogen as a by-product, can be operated over wide ranges of temperature and pressure, and does not require the removal of $CO_2$ from the input. In the form illustrated below, our process is designed to process 19 tons of air per day to produce (a) 4.4 tons of oxygen per day at a purity of 99 percent and (b) 14.6 tons of nitrogen per day at a purity of 99.7 percent.

Referring to FIG. 2, the plant lay-out and process flows are generally similar to those described above in connection with the recovery of carbon dioxide. Dry input air is fed continuously through line 22 and blended with a recycle gas stream (to be described) fed through line 38. The resulting mixture is compressed in a pump 23 to a pressure of 50 atmospheres, the operating pressure selected for the absorption zone. The compressed gas is passed through a standard dessicator (not shown) and then through cooler 24 and a chiller 25 to reduce its temperature to 0°F, the operating temperature selected for the absorption zone. The chilled gas mixture is fed through an inlet 26 into the bottom portion of a packed-column absorber 27, where it is contacted with a downflowing liquid fluorocarbon ($CCl_3F$, in this example) introduced to the upper part of the column through an inlet 28. The conditions for contacting (Table 15, below) are selected to effect absorption in the $CCl_3F$ of 99.9 percent of the input oxygen and 63.3 percent of the input nitrogen. The unabsorbed gas, which is 99.7 percent nitrogen, flows from the top of the absorber and is directed, by means of block valves 29–30 through a standard expansion turbine 52, wherein it expands isentropically. The expanded gas preferably is used as a process cooling medium before collection as a by-product.

Solvent containing dissolved oxygen and nitrogen is withdrawn from the bottom of the Absorber 27 and, after warming to 130°F in a heat exchanger 31, is directed through a flash chamber 32, maintained at 3 atmospheres and $\approx$130°F. The solvent effluent from chamber 32 is directed through an inlet 33 connected into the top portion of a packed-column fractionator 34, operated at 3 atmospheres and 130°F and designed to provide 19 transfer units. The solvent flows downwardly through the fractionator, in contact with gas and vapor rising from a solvent reboiler 37 connected into the bottom of the fractionator and maintained at 130°F. This contact desorbs 99.84 percent of the nitrogen which co-absorbed with oxygen in the absorber 27; thus the dissolved gas remaining in the solvent effluent from the bottom of the fractionator is highly enriched in oxygen. The countercurrent contact in the fractionator also desorbs 90.3 percent of the dissolved oxygen in the solvent input to that column. The gases desorbed in the fractionator are withdrawn through a line 53 and passed through an overhead condenser 36, which is maintained at a temperature providing the necessary reflux solvent at the pressure of operation and controlling solvent losses by liquefying solvent vapor. Off-gas from the flash chamber 32 also is fed into the condenser through line 35, as shown. The gas effluent from the condenser is recycled through aforementioned line 38 for blending with air to form the input for the absorber 27.

Oxygen-enriched solvent is withdrawn from the reboiler 37 through a line 54 and is directed through a flash chamber 39 and inlet 55 into the top portion of a packed-column stripper 40. The stripper, designed for 17 transfer units, operates at 2 atmospheres and 115°F. A solvent reboiler 42 is connected into the bottom of the stripper and operated at 115°F to generate gases and solvent vapors which rise in the stripper in countercurrent contact with the oxygen-enriched solvent introduced through inlet 55. As a result, essentially all of the gas in the solvent is desorbed. The desorbed gas, along with off-gas from the flash chamber 39, is fed through an overhead condenser 41, operated at a temperature liquefying solvent vapor. The liquefied vapor drains back into the column. The gaseous effluent from the condenser is 99 percent oxygen and is withdrawn as rich product through line 44. Essentially pure liquid solvent is withdrawn from the stripper reboiler 42 by a pump 43 and fed as warming medium through the heat exchanger 31 and then chilled to 0°F in a cooler 58. The chilled solvent then is returned to the top portion of the absorber 27 for re-use as the absorbent therein.

In summary, this form of our process takes advantage of the fact that oxygen is more soluble in $CCl_3F$ than is nitrogen. In the absorber, essentially all of the oxygen is preferentially dissolved, leaving a pure nitrogen off-gas. In the fractionator, nitrogen is preferentially desorbed, enriching the dissolved gas in oxygen. In the stripper, the oxygen and any nitrogen remaining are collected as product. Tables 14 and 15 (below) summarize respectively the plant performance data and column design data for this example.

It will be understood that this form of our process can be easily adapted to producing oxygen and nitrogen products having purities other than those indicated in Table 14. For purities below a certain level, economies can be achieved by reducing equipment size and, in some instances, eliminating the fractionator. As indicated, advantage is taken of the heat transfer between hot and cold process streams, and the by-product nitrogen stream is used as a coolant; such techniques are particularly attractive at high production rates. Further improvements in efficiency can be effected by multiple feeding of the absorber to minimize back-mixing.

The oxygen-rich product gas obtained as described contains essentially all of the krypton, xenon, argon, and carbon dioxide present in the air feed, whereas the by-product nitrogen stream contains neon and helium. If desired, these various components can be recovered from the oxygen or nitrogen by any suitable technique, including selective absorption with a liquid fluorocarbon.

TABLE 14

PLANT PERFORMANCE DATA—PRODUCTION OF ENRICHED OXYGEN

|  | Flow Rate scfd | Composition, % Nitrogen | Oxygen |
|---|---|---|---|
| Process Feed | 475,500 | 79 | 21 |
| Lean Product | 375,500 | 99.7 | 0.3 |
| Rich Product | 100,000 | 1.0 | 99.0 |
| Absorber Feed | 2,040,800 | 50 | 50 |
| Fractionator Recycle | 1,565,300 | 41.2 | 58.8 |

$CCl_3F$ Flow Rate = 620 gpm
Oxygen Production = 4.4 tons/day at 99% purity
Nitrogen Production = 14.6 tons/day at 99.7% purity

TABLE 15

COLUMN DESIGN DATA

|  | Absorber | Fractionator | Stripper |
|---|---|---|---|
| Operating Pressure, atmospheres | 50 | 3 | 2 |
| Operating Temperature, °F | 0 | 130 | 115 |
| Key Component | Oxygen | Nitrogen | Oxygen |
| L/kG (or L/kV) for Key Component | 1.37 | 0.73 | 0.5 |
| Percent absorbed or Stripped for Key component | 99.9 | 99.84 | 99.99 |
| Number of Transfer Units | 21 | 19 | 17 |
| Height of Transfer Unit, ft | 3 | 3 | 3 |
| Packing (Pall Rings) Size, In. | 3.5 | 3.5 | 3.5 |
| Column Packing Height, ft | 63 | 57 | 51 |
| Column Diameter, ft | 3 | 3 | 3 |
| Approximate Solvent Boilup, lb moles/hr | — | 10 | 45 |

In general, our process is highly flexible. As will be apparent to those versed in the art, the above-illustrated separations can be conducted with a wide range of throughputs and with a variety of equipment, fluorocarbon solvents, and contacting conditions (e.g., temperature and pressure). For example, the absorption operation may be conducted conveniently at a temperature in the range of at least about −200° to 250°F and at a pressure ranging from one to hundreds of atmospheres. As indicated above, the use of multiple absorbers, fractionators, or strippers may be of advantage in some applications of our process. In some instances, multiple feed points may be preferred for the absorbers to minimize back-mixing. Similarly, selection of feed points in the stripper may be used to combine enrichment and depletion operations in a single column. The stripping operation has been illustrated in terms of contacting the enriched fluorocarbon absorbent with fluorocarbon vapor, but desorption also may be accomplished by contacting the absorbent with a condensable or reactive gas.

What is claimed is:

1. The process of removing a component selected from the group consisting of oxygen, iodine, methyl iodide, and the lower oxides of carbon, nitrogen, and sulfur from a feed gas mixture containing said component, said process comprising passing said gas mixture through an absorption zone at superatmospheric pressure and a temperature in the range of about −200° to +250°F in flowing contact with a liquid fluorocarbon to preferentially absorb said component in said fluorocarbon, withdrawing unabsorbed constituents of said gas mixture from said absorption zone, and separately withdrawing therefrom a stream of liquid fluorocarbon enriched in said component.

2. The process of claim 1 wherein said stream enriched in said component is passed through a gas-stripping zone at a lower pressure than said absorption zone in flowing contact with a gaseous stripping agent to desorb gas from said stream, thereby at least partially regenerating said liquid fluorocarbn, and recycling said at least partially regenerated fluorocarbon to said absorption zone for flowing contact with said feed gas mixture.

3. The process of claim 2 wherein said gaseous stripping agent enriched in the gas desorbed from said stream is separately withdrawn from said gas-stripping zone.

4. The process of claim 2 wherein, prior to passage through said gas-stripping zone, said stream enriched in said component is passed through a fractionating zone at a pressure intermediate of the respective pressures in said absorption zone and said gas-stripping zone to preferentially desorb from said stream gases less soluble therein than said component.

5. The process of claim 1 wherein said liquid fluorocarbon is a member selected from the group consisting of alkane and cycloalkane derivatives having at least one fluorine atom; perfluoroamines; and perfluoroethers.

6. The process of claim 1 wherein said component is selected from the group consisting of oxygen and lower oxides of carbon, nitrogen, and sulfur and wherein said process includes the additional steps of:
   a. passing said stream of liquid fluorocarbon enriched in said component through a reduced-pressure zone to desorb from said stream dissolved gases less soluble therein than said component;
   b. passing the effluent liquid fluorocarbon from said reduced-pressure zone through a stripping zone at a pressure below that of said absorption zone in flowing contact with a gaseous stripping agent to desorb said component from said effluent liquid fluorocarbon; and
   c. recovering the resulting component-rich vapor from said stripping zone.

7. The process of claim 6 wherein said liquid fluorocarbon is a member selected from the group consisting of alkane and cycloalkane derivatives having at least one fluorine atom; perfluoroamines; and perfluoroethers.

8. The process of claim 1 wherein said component is selected from the group consisting of iodine and methyl iodide and wherein said process includes the additional steps of:
   a. passing the enriched stream of liquid fluorocarbon through a reduced-pressure zone to desorb from said stream a part of the dissolved gases less soluble therein than said component;
   b. passing the effluent liquid fluorocarbon from said reduced-pressure zone through a stripping zone at a pressure below that of said absorption zone in flowing contact with a gaseous stripping agent to desorb additional of said gases less soluble therein than said component; and
   c. separately withdrawing from said stripping zone a stream of liquid fluorocarbon enriched in said component.

9. The process of claim 8 wherein said stream of liquid fluorocarbon enriched in said component is processed to recover at least part of the iodine therein.

10. The process of claim 8 wherein said liquid fluorocarbon is a member selected from the group consisting of alkane and cycloalkane derivatives having at least one fluorine atom; perfluoroamines; and perfluoroethers.

* * * * *